Nov. 11, 1969 D. A. SIMPSON ET AL 3,477,759
INTERIOR PANEL MEMBER FOR AN AUTOMOBILE
Filed Oct. 2, 1967 2 Sheets-Sheet 1
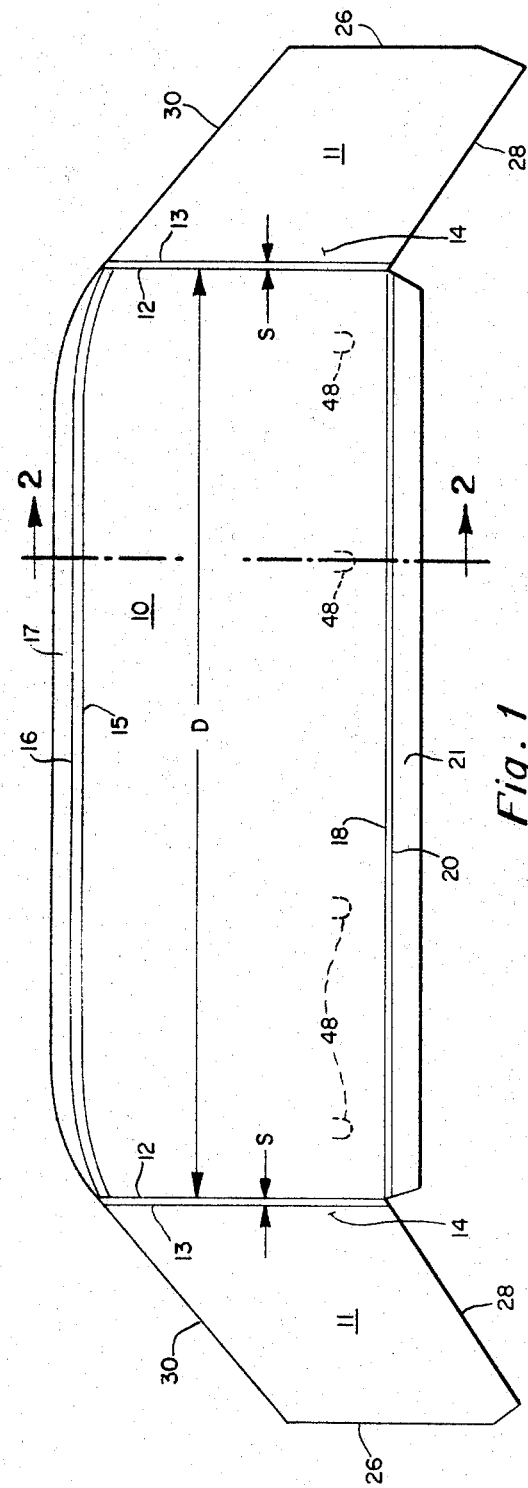
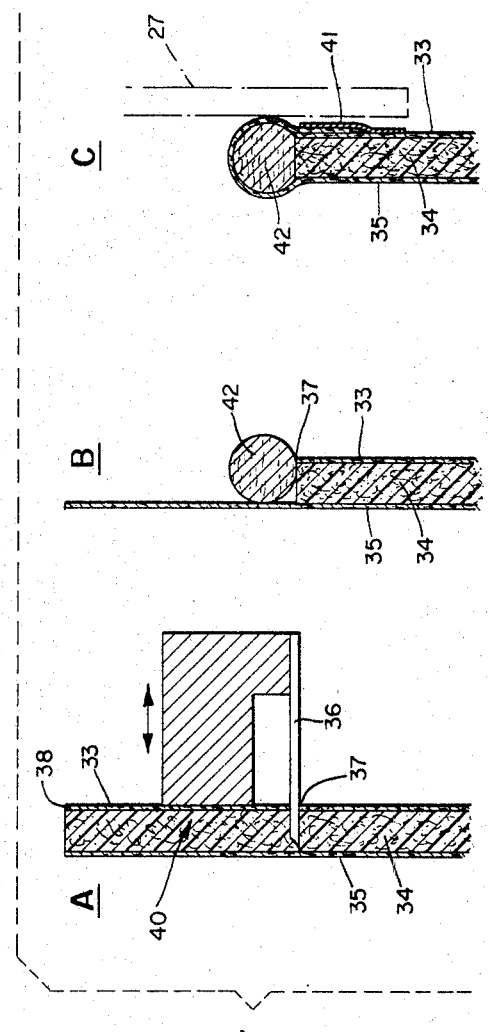
INVENTORS.
DONALD A. SIMPSON
RICHARD L. SWIFT
BY
ATTORNEY.

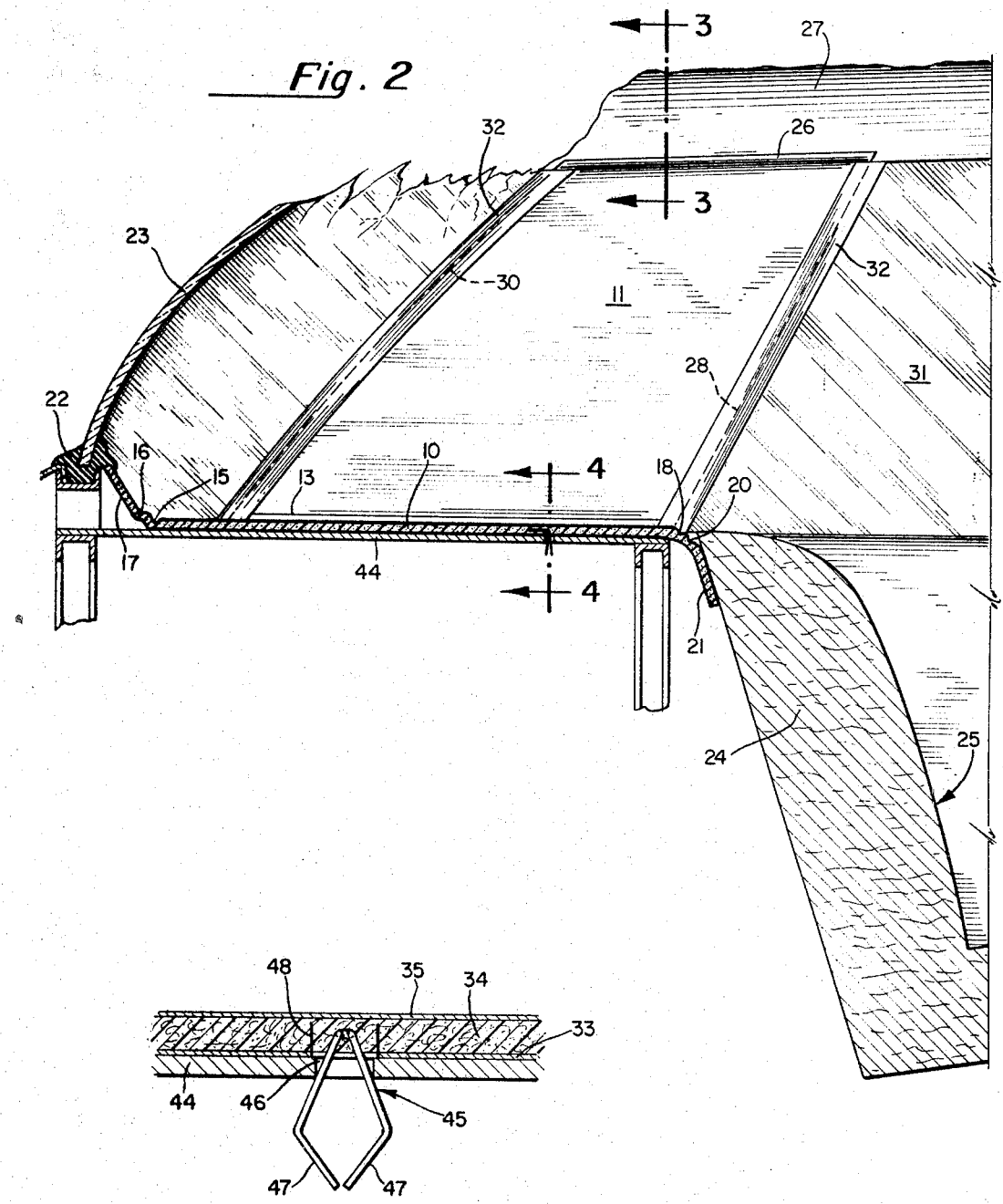

United States Patent Office 3,477,759
Patented Nov. 11, 1969

3,477,759
INTERIOR PANEL MEMBER FOR AN AUTOMOBILE
Donald A. Simpson, Indianapolis, Ind., and Richard L. Swift, Wilbraham, Mass., assignors to Scott Paper Company, Delaware County, Pa., a corporation of Pennsylvania
Filed Oct. 2, 1967, Ser. No. 672,329
Int. Cl. B62d 25/08
U.S. Cl. 296—28                                                                    10 Claims

ABSTRACT OF THE DISCLOSURE

An interior trim panel member is disclosed for use in motor vehicles which incorporates in an integral piece of sheet material, an intermediate portion which serves as a package tray adapted for disposition substantially horizontally between the rear window and the back of the seat, and spaced-apart end portions forming rear upper quarter panels adapted to at least partially cover solid body portions between the side windows and the rear window. By fabricating the above trim member as an integral structure from a single piece of material, installation in an automobile is facilitated and unsightly junctures between the package tray and the rear upper quarter panels are eliminated. The panel member of the invention includes a plurality of closely spaced and parallel score lines dividing each end portion from the intermediate portion and allowing installation of the panel member into automobile bodies having varying dimensions. A method is also disclosed for forming rounded decorative edges on portions of the panel member which eliminate the need for interior garnish molding previously required to cover unfinished edges of panel members.

BACKGROUND OF THE INVENTION

Field of the invention

The present invention relates to improvements in interior panel members of the type used as interior trim in motor vehicles and, more particularly, to an integral member comprising both a package tray beneath the rear window of an automobile and rear upper quarter panels covering portions of the automobile body between the side windows and the rear window. The invention also relates to methods for forming the above panel members and, particularly, to a method for forming a decorative rounded edge along peripheral portions of the panel members.

Description of the prior art

In the fabrication of motor vehicles, which is normally done in assembly line fashion, it is customary to install interior trim members or panels over portions of the interior surface of the automobile body to present a decorative surface to the interior. For example, such panels are normally installed over the body portions between the rear window and the side windows and also a separate panel member is normally installed between the back of the seat and the lower edge of the rear window to serve as a package tray. Such panel members are generally made of laminated material having an outer layer on one surface which is decorative in nature. In the construction of motor vehicles, such panel members conventionally are fastened down along their edges in some manner, generally by the use of garnish molding of one type or another.

Although many different techniques have been employed in connection with the above-mentioned construction, none of the techniques have taken into account satisfactorily the variations in body dimensions from one automobile to the next which often are as large as 3/4" across the width of the automobile. One particularly notable problem area in this regard are the junctures between the rear upper quarter panels of the automobile and the ends of the package tray disposed beneath the rear window and extending between the bottom of the rear window and the back of the rear seat. Holes or spaces are formed in these junctures which are not only unsightly but which collect dirt and are difficult to clean. In addition, items of small size stored in the package tray are lost in the junctures, necessitating removal of the back seat to retrieve them.

Another problem has been the finishing or servicing of edges of such panel members so that they directly adjoin other panel members without the need for garnish molding. For example, the rear upper quarter panels may be pressed against the decorative surface of the headliner of the automobile in a manner which eliminates the need for any garnish molding over the juncture, which normally raises the cost as well as the complexity of fabrication of the automobile.

It is an object and advantage of the present invention to provide an interior trim member which includes both a package tray and rear upper quarter panels in an integral part.

It is a further object and advantage of the invention to provide such an interior trim member that is fabricated in a manner allowing its installation into automotive vehicles of differing body dimensions.

It is a still further object and advantage of the present invention to provide a method for forming decorative rounded edges along portions of the periphery of interior trim panels for automobiles.

SUMMARY OF THE INVENTION

The invention is an interior trim member for an automobile having a rear window, side windows, solid body portions between each of the side windows and the rear window, and a seat with a back, and comprises an integral piece of sheet material having an intermediate portion and spaced-apart end portions. The end portions comprise rear upper quarter panels adapted to at least partially cover the solid body portions, and the intermediate portion comprises a package tray adapted to be disposed substantially horizontally between the rear window and the back of the seat. The end portions are adapted to be bent upwardly from the plane of the intermediate portion along fold lines dividing the end portions from the intermediate portion.

In a specific embodiment of the invention, the integral piece of sheet material is selectively foldable along at least one of a plurality of spaced-apart and substantially parallel lines dividing each of the end portions from the intermediate portion, so that the end portions extend upwardly from the plane of the intermediate portion. In this manner, the bottom portions of the upstanding end portions which are adjacent the intermediate portion may be spaced from one another by a variable distance depending upon the inside body dimensions of an automobile. In a more specific embodiment of the invention, the intermediate portion has a rear flap adapted for retention adjacent the rear window. The flap extends along the rear edge of the intermediate portion and is foldable along at least one line, dividing the flap and the intermediate portion, into a position out of the plane of the intermediate portion. In another embodiment of the invention, the intermediate portion has a front flap adapted for retention adjacent the back of the seat. The flap extends along the front edge of the intermediate portion and is foldable along at least one line, dividing the flap and the intermediate portion into a position out of the plane of the intermediate portion. In certain embodiments, the interior trim members of the invention are comprised of laminated sheet material having at least two layers, one of which layers has a decorative outwardly-facing surface. The decorative layer extends beyond or overlaps at least one of the remaining layers on the outer ends of the spaced-apart end portions and it is folded over and secured to the back side of the liminated to present a decorative rounded edge on each outer end. To accentuate this feature, other embodiments include an elongate strip of material having a minimum cross-sectional dimension of greater than the thickness of the remaining layers disposed along the outer end of each spaced-apart end portion and enclosed by the decorative layer when it is folded over and secured to the back side of the laminate.

The method of the invention comprises providing a substantially flat panel of flexible semi-rigid material having a plurality of layers, one of the layers having a decorative surface which is the surface to be exposed to the interior of the automobile. The panel is initially cut to a preselected shape and then cut from the side opposite the layer having a decorative surface through at least one of the layers without severing the layer having a decorative surface and along at least one line adjacent to and inwardly spaced from at least one selected portion of the periphery of the preselected shape. Portions of the cut layers extending outwardly from the lines of severance to the periphery of the preselected shape are then removed from the preselected shape, thereby forming thin peripheral portions having a lesser thickness than the remainder of the panel. These thin peripheral portions are then folded over onto the back side of the panel and secured thereto.

BRIEF DESCRIPTION OF THE DRAWINGS

FIGURE 1 is a plan view of an interior trim member of the invention, with the end portions lying in the plane of the intermediate portion, FIGURE 2 is a sectional side elevation view taken along line 2—2 of FIGURE 1, illustrating schematically the installation of the trim member in a typical automobile.

FIGURES 3A, 3B and 3C are greatly enlarged sectional views, illustrating the manner in which a rounded decorative edge is formed along peripheral portions of the trim member, and FIGURE 4 is greatly enlarged sectional elevation view, illustrating one manner in which interior trim members are secured to an automobile.

DESCRIPTION OF THE PREFERRED EMBODIMENT

Referring now to FIGURE 1, an interior trim member of the invention is shown having an intermediate portion 10 adapted to serve as a package tray in an automobile, and spaced-apart end portions 11 adapted to serve as rear upper quarter panels in an automobile. End portions 11 are divided from intermediate portion 10 by two score lines 12 and 13 separated from each other by a distance indicated by the letter S. The distance between the score line 12 nearest the intermediate portion 10 on one end relative to the corresponding score line 12 on the other end is indicated by the letter D. The score lines 12 and 13 comprise fold lines and are in the form of creases or grooves pressed into the laminated sheet material along which the material may be folded to place the end portions 11 in an upstanding position relative to the plane of the package tray or intermediate portion 10. It will be seen that the end portions 11 might be folded entirely about the score lines 12 so that their bottom ends 14 adjacent the package tray or intermediate portion 10 were spaced-apart from one another by a distance D. Similarly the end portions 11 might be folded into an upstanding position along score lines 13 so that their bottom portions 14 were spaced-apart from one another by a distance $D+2S$. Since the end portions 11 may be folded about both of the lines 12 and 13 to some degree in between the above extremes, it is possible for the structure to be utilized in automobiles having variations in their interior dimensions as great as 2S.

The lines designated above as score lines may be, alternatively, created by any treatment which promotes folding of the panel along the desired line, such as a line of perforations or a line of spaced indentations. The lines generally have a width of from about $\frac{1}{16}''$ to about $\frac{1}{4}''$ and are spaced from one another by a distance of from about $\frac{1}{8}''$ to about $\frac{1}{2}''$.

Intermediate portion 10 has score lines 15 and 16 adjacent its rear edge which divide from it a rear flap 17 adapted for retention adjacent the rear window. Similarly score lines 18 and 20 adjacent the front edge of intermediate portion 10 divide from it a front flap 21 adapted for retention adjacent the back of the seat. Score lines 15, 16, 18 and 20 are formed in the same manner as score lines 12 and 13 described above and comprise multiple fold lines along which the material forming the panel member of the invention may be bent.

FIGURE 2 illustrates one manner in which these respective flaps 17 and 21 are retained. The rear flap 17 is generally bent upwardly along score lines 15 and 16 and retained by a portion of the rubber seal 22 holding the bottom edge of the rear window 23 of the automobile. Front flap 21 is generally bent downwardly and tucked behind the back 24 of the seat 25. In some instances, garnish molding (not shown) may be employed across the top of the seat back 24 to close the juncture between the seat back 24 and the intermediate portion 10. The end portion 11 forming the rear upper quarter panel has its outer end edge 26 pressed into engagement with a headliner 27 and its side edges 28 and 30 retained adjacent the rear window 23 and the side window 31, respectively, by rubber molding in a manner similar to that employed with rear flap 17 or by garnish molding 32 as shown in FIGURE 2. The outer end edge 26 of end portion 11 is preferably formed into a decorative rounded edge as described below with reference to FIGURES 3A through 3C.

In each of the above instances where multiple, closely spaced, parallel score lines are shown, it will be apparent that the number of such lines is generally unimportant and additional lines could be utilized to promote folding, especially where materials having a greater stiffness were employed in the panel member. The distance S represents, in those instances, the distance between the two lines spaced-apart from each other the farthest on each respective end of intermediate portion 10. It is also contemplated that, alternatively to the use of score lines 15, 16, 18 and 20 to divide rear flap 17 and front flap 21 from intermediate portion 10, the material forming these portions of the panel member might be molded and heat set in the proper or desired position depending from the plane of intermediate portion 10.

The interior trim panel of the invention is preferably formed from a composite sheet having a peripheral shape and dimensions and a compound curved contour, each of which is accurately predetermined in view of the intended use of the panel. The composite sheet comprises, essentially, a core consisting of a layer or sheet of a foamed plastic material of uniform thickness which is compressible without rupture, which has the compound curved contour of the panel, and a sheet material adhered to each of its surfaces which accurately follows the compound curvature of the core without wrinkles or folds. The foamed plastic core of this panel is flexible, but has an elastic memory which causes the panel to return to its original compound curvature after reasonable distortion thereof. This flexibility, and its ability to return to its original contour, permits the distortion of the panel during installation, followed by its return to its original compound curvature.

One of the sheets on the outer surface of this interior trim panel has a decorated, outer surface which will be referred to as the "face" of the panel and the sheet is the "facing layer" of the panel. The reverse surface of this interior trim panel, which is usually not decorated, will be referred to as the "back" of the panel and the sheet on the back is the "backing layer" of the panel.

The paper sheet which is adhered to the back of the foamed core of the panel, forming its back undecorated surface and comprising the backing layer, may be impregnated and/or coated with a film of a film-forming material, to render it moisture and water-resistant. It is, preferably, both impregnated and coated on its outer surface with an organic, film-forming material which is soluble in a volatile, organic solvent, which is also a solvent of softening agent for the foamed plastic material which forms the core of the panel.

The sheet material which is adhered to the face surface of the foamed plastic core to produce this decorated laminated panel and which forms the facing layer of the panel, may be a single sheet of paper, or a plastic film or foam, or of a woven or felted textile fabric which has a decorative outer surface which forms the face of the panel. Alternatively, this sheet material may be a laminate of a sheet of paper adhered to a second sheet of paper, or of plastic film, or of a woven or felted textile fabric which has a decorative outer surface, by a film or layer of a waterproof adhesive. Again, it may be a laminate of a sheet of paper adhered to a second sheet of paper by a film or layer of adhesive, the outer surface of which is, in turn, adhered to a third sheet of paper which has a decorated outer surface, by a layer of a thermoplastic resin such as, for example, polyethylene or polypropylene.

The foamed plastic which is used as the core of this decorated, laminated panel is a plastic which contains many thousands of closed gas cells per cubic centimeter. It is of the type which has come to be known as "rigid foam," in contrast to the so-called "flexible foam." This rigid foamed plastic is one which is softened by a properly selected, volatile, organic solvent, and preferably, by a volatile, organic solvent which is noninflammable. It is in the form of a sheet which may have a thickness within the range of about 3/16 of an inch to about 1/8 of an inch. Foamed polystyrene is presently preferred for forming the foamed plastic layer because of its low cost and the ease with which it may be foamed into the desired compressible, somewhat soft product, having great numbers of fine cells, yet it will be understood that various other plastics may be used. Polyvinyl chloride resin, polyurethane resin, polyester resin, urea-formaldehyde resin, and the like, may be used. The plastic used as the foamed core of the laminate must be selected in view of the alternative which is to be used in imposing the compound curvature in forming the panel. In the alternative in which a volatile solvent is used, the plastic of the foamed core should be one that is readily softened by the use of a volatile solvent. In the alternative in which the laminate is given a compound curvature by the use of heat, the plastic of the foamed core should be thermoplastic in nature. It has been found that a foamed polystyrene core is readily deformed by either of these methods, after deformation to a compound curvature, and has a high percentage retention of the compound curvature.

As indicated above, interior trim panels of the invention may have portions which are molded to a compound curvature to enable them to more accurately follow the contour of the automobile body and to present a more attractive interior. One method of accomplishing this is of soften the foam core of the laminate, reorienting or shifting its cell structure while in the softened state by holding the laminate in a compound curved shape and then hardening the foamed core while so held.

In the case of laminates which carry a facing laminate of two or more plies, or such a backing laminate or both, it is usually desirable to hold the portion of the laminate to be molded in a compound curvature which somewhat exaggerates the curvature which is desired in the final panel member, to compensate for a tendency of the multiple facing laminate, the multiple backing laminate, or both, as the case may be, to hold their original planarity and to place the foamed core of the final laminate under tension which tends to flatten out its compound curvature.

The extent of such exaggeration of the compound curvature will depend upon the exact manner in which the foamed core is softened and in which it is held in a compound curved configuration and can be readily determined by trial and error. For example, the compound curved surfaces of the mold which are used to form the laminate may be formed with the exact configuration desired in the finished panel, a test-panel made, and the mold surface ground to alter its contour to produce a panel having the desired configuration.

In carrying out this method, the step of softening the foamed core of the laminate and permitting it to harden in a curved configuration may be carried out in either of two alternative steps. The foamed core may be softened by moistening it with a volatile solvent and then hardened by the evaporation of the volatile solvent. Alternatively, it may be softened by heat and then hardened by permitting it to cool to room temperature. In the case of each of these alternatives, it is necessary to affirmatively retain the laminate in the compound curved configuration until its foamed core is at least partially hardened. In a rapid production operation, the extent to which the hardening of the foamed core is completed before the laminate is released from affirmative retention in a compound curved configuration must be correlated with the exaggeration of the desired final curvature of the panel which is built into the mold as described hereinbefore, since the resistance of the foamed core to the flattening action of the other laminates is determined by the extent to which its hardening has been completed.

FIGURES 3A through 3C illustrate one manner of forming a decorative rounded edge along peripheral portions of the interior trim members of the invention. As shown in FIGURE 3A, the material from which the panel is made comprises a backing layer 33, an interior foam layer 34 and a facing decorative layer 35. The panel is cut by a blade 36 along a line 37 spaced from its periphery 38 through the backing layer 33 and through at least a portion of the interior foam layer 34 without severing the decorative layer 35. In some instances, the portion 40 of the backing layer 33 and the interior layer 34 extending between the severance line 37 and the periphery 38 of the article is removed and the decorative layer 35 is folded over onto the back 33 of the panel and secured thereto as by adhesive, or tape 41 as shown in FIGURE 3C. The preferred method includes the insertion of an elongate strip 42 of material having a minimum cross-sectional dimension of greater than the thickness of the severed layers along the line of severance 37, as shown in FIGURE 3B. The decorative layer 35 is then folded over onto the back side 33 around the elongate strip 42 of material, enclosing the same, and holding it against the end of the severed layers. The folded-over portion 43 is then secured to the back side 33 as by adhesive, or tape 41 as shown in FIGURE 3C.

Returning now to FIGURES 1 and 2, one manner of attachment of interior trim members of the invention to the motor vehicle will be described. Intermediate portion 10 is generally disposed upon a metal tray 44 forming a portion of the frame of an automobile and is secured thereto by any one of a variety of snap fasteners 45, embedded into the laminated panel or secured thereto in some manner and cooperating with holes 46 in the metal tray 44 to retain the intermediate portion 10 of the panel or trim member adjacent the tray 44. FIGURE 4 shows a greatly enlarged view of one type of fastener element 45 utilized for fastening a trim member of the invention to an automobile. The fastener element 45 is inserted through one or more of the layers of the laminated panel and embedded therein. To facilitate insertion of fastener element 45 into the panel, one or more layers are severed at spaced positions 48 along intermediate portion 10 so that a portion of fastener element 45 may be inserted between the severed layers and the facing layer 35. Preferably, a portion of fastener element 45 is inserted into the interior foam layer 34 and frictionally retained therein. A portion of the fastener element 45 comprising two spread prongs 47 depends vertically outward from the back layer 33 of the panel and passes through a hole 46 in the metal tray 45 when the prongs 47 are resiliently bent toward one another to form a smaller configuration. Upon passing through the hole 46, the prongs 47 of the fastener element 45 spread apart to a larger configuration than the hole 46, preventing withdrawal through hole 46 and securing the panel to the metal tray 44.

What is claimed is:

1. An interior trim member for an automobile having a rear window, side windows, body portions between each of said side windows and said rear window, and a seat with a back, comprising an integral piece of sheet material having an intermediate portion and spaced-apart end portions, said end portions comprising rear upper quarter panels which at least partially cover said body portions of said automobile, and said intermediate portion comprising a package tray which is disposed substantially horizontally between said rear window and the back of said seat.

2. An interior trim member according to claim 1, wherein said end portions are adapted to be bent upwardly from the plane of said intermediate portion along lines dividing said end portions from said intermedate portion.

3. An interior trim member according to claim 1, wherein said sheet material possesses substantial rigidity and said integral piece is selectively foldable along at least one of a plurality of spaced-apart and substantially parallel lines dividing each of said end portions from said intermediate portion, so that said end portions extend upwardly from the plane of said intermediate portion, whereby the bottom portions of said upstanding end portions are spaced from one another by a distance of between about $D$ and about $D+2S$, wherein S is the distance between the parallel lines and D is the distance between the parallel lines nearest the intermediate portion depending up 4. An interior trim member according to claim 1, wherein said intermediate portion has a rear flap adapted for retention adjacent said rear window, said flap extending along the rear edge of said intermediate portion and being foldable along at least one line dividing said flap and said intermediate portion into a position out of the panel of said intermediate portion.

5. An interior trim member according to claim 4, wherein said sheet material is moldable and said flap is molded into a position out the plane of said intermediate portion.

6. An interior trim member according to claim 1, wherein said intermediate portion has a front flap adapted for retention adjacent the back of said seat, said flap extending along the front edge of said intermediate portion and being foldable along at least one line dividing said flap and said intermediate portion into a position out of the plane of said intermediate portion.

7. An interior trim member according to claim 6, wherein said sheet material is moldable and said flap is molded into a position out of the plane of said intermediate portion.

8. An interior trim member according to claim 1, wherein said intermediate portion has both a front and a rear flap, said front flap being adapted for retention adjacent the back of said seat and extending along the front edge of said intermediate portion and being foldable downwardly along at least one line dividing said flap and said intermediate portion into a downward position out of the plane of said intermediate portion, said rear flap being adapted for retention adjacent said rear window and extending along the rear edge of said intermediate portion and being foldable upwardly along at least one line dividing said flap and said intermediate portion into an upward position out of the plane of said intermediate portion.

9. An interior trim member according to claim 1, wherein said sheet material is a laminate having at least two layers, one of said layers being decorative, said decorative layer overlapping at least one of the remaining layers on the outer ends of said spaced-apart end portions and being folded over and secured to the back side of said laminate to present a decorative rounded edge on said outer ends.

10. An interior trim member according to claim 9, including an elongated strip of material having a minimum cross-sectional dimension of greater than the thickness of said remaining layers disposed along the outer end of each spaced-apart end portion and enclosed by said decorative layer when folded over and secured to the back side of said laminate.

References Cited

UNITED STATES PATENTS

| | | | |
|---|---|---|---|
| 454,783 | 6/1891 | Walter | 296—70 |
| 2,559,443 | 7/1951 | Kuhler | 52—273 X |
| 3,068,043 | 12/1962 | Komenda | 296—31 |

LEO FRIAGLIA, Primary Examiner

J. A. PEKAR, Assistant Examiner

U.S. Cl. X.R.

156—216, 257